US005704025A

United States Patent [19]

Berry

[11] Patent Number: 5,704,025

[45] Date of Patent: Dec. 30, 1997

[54] COMPUTER GRAPHICS SYSTEM HAVING PER PIXEL DEPTH CUEING

[75] Inventor: Kyle R. Berry, Fort Collins, Colo.

[73] Assignee: Hewlett-Packard Company, Palo Alto, Calif.

[21] Appl. No.: 488,641

[22] Filed: Jun. 8, 1995

[51] Int. Cl.[6] ........................................... G06F 15/00
[52] U.S. Cl. ............................................... 395/131
[58] Field of Search ................................ 395/126, 140, 395/141, 131; 345/150, 153

[56] References Cited

U.S. PATENT DOCUMENTS 5,237,650  8/1993  Priem et al. ........................ 395/143
5,287,436  2/1994  Fisher et al. ....................... 395/143

Primary Examiner—Phu K. Nguyen

[57] ABSTRACT

In a computer graphics system, per vertex depth cue scale factor values and depth cue rendering parameters are determined for the vertices of a triangle to be displayed. Interpolation circuitry determines a per pixel depth cue scale factor and per pixel color values for each of the pixels in the triangle. When the computer graphics system includes texture mapping hardware, a blending circuit combines the per pixel color values and the texture mapped color values to provide per pixel resulting color values. The per pixel depth cue scale factor value, the per pixel resulting color values and a depth cue color are used to determine per pixel depth cued color values for each of the pixels in the triangle. Accurate depth cueing is achieved with or without texture mapping.

15 Claims, 4 Drawing Sheets

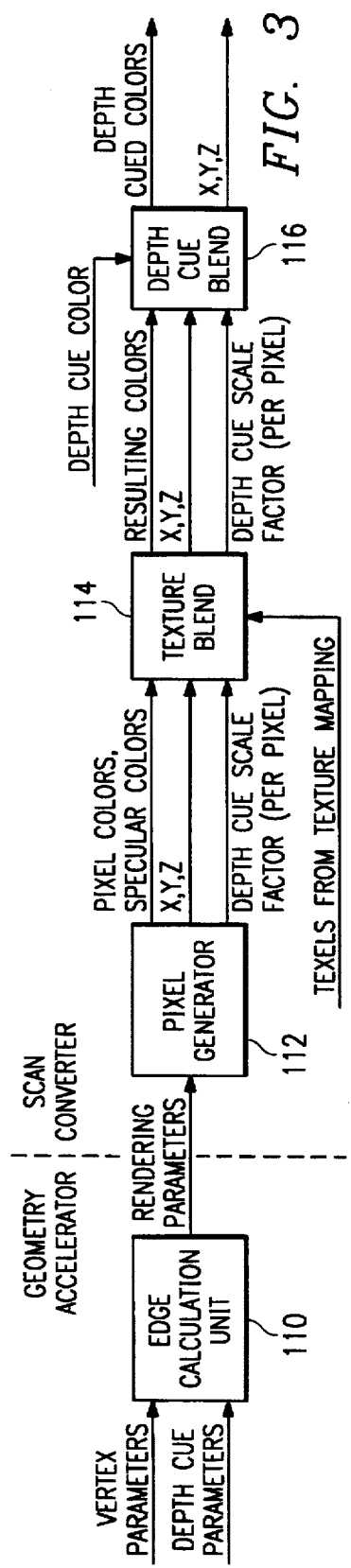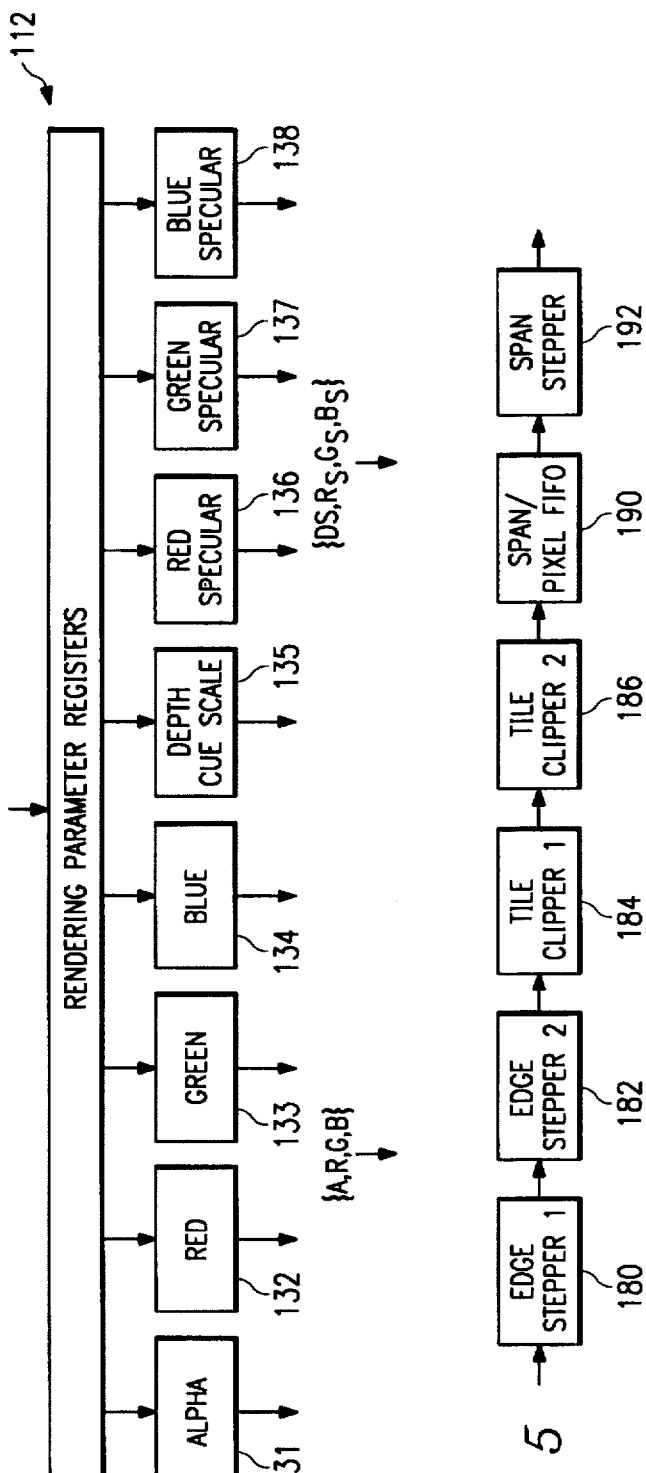

COMPUTER GRAPHICS SYSTEM HAVING PER PIXEL DEPTH CUEING

FIELD OF THE INVENTION

This invention relates to color rendering in computer graphics systems and, more particularly, to methods and apparatus for performing depth cueing on a per pixel basis.

BACKGROUND OF THE INVENTION

Computer graphics systems are commonly used for displaying graphical representations of objects on a two-dimensional video display screen. Current computer graphics systems provide highly detailed representations and are used in a variety of applications.

In typical computer graphics systems, an object to be represented on the display screen is broken down into graphics primitives. Primitives are basic components of a graphics display and may include points, lines, vectors and polygons, such as triangles. Typically, a hardware/software scheme is implemented to render, or draw, the graphics primitives that represent a view of one or more objects being represented on the display screen.

Typically, the primitives of the three-dimensional object to be rendered are defined by a host computer in terms of primitive data. For example, when the primitive is a triangle, the host computer may define the primitive in terms of the X,Y,Z coordinates of its vertices, as well as the R,G,B color values of each vertex. Rendering hardware interpolates the primitive data to compute the display screen pixels that represent each primitive, and the R,G,B values for each pixel.

Early graphics systems failed to display images in a sufficiently realistic manner to represent or model complex three-dimensional objects. The images displayed by such systems exhibited extremely smooth surfaces absent textures, bumps, scratches, shadows and other surface details present in the object being modeled.

As a result, methods were developed to display images with improved surface detail. Texture mapping is one such method that involves mapping a source image, referred to as a texture, onto a surface of a three-dimensional object, and thereafter mapping the textured three-dimensional object to the two-dimensional graphics display screen to display the resulting image. Texture mapped surface detail attributes commonly include color, specular reflection, vector perturbation, specularity, transparency, shadows, surface irregularities and grading.

Texture mapping involves applying one or more point elements (texels) of a texture to each point element (pixel) of the displayed portion of the object to which the texture is being mapped. Texture mapping hardware is conventionally provided with information indicating the manner in which the texels in a texture map correspond to the pixels on the display screen that represent the object. Each texel in a texture map is defined by S and T coordinates which identify its location in the two-dimensional texture map. For each pixel, the corresponding texel or texels that map to it are accessed from the texture map, and incorporated into the final R,G,B values generated for the pixel to represent the textured object on the display screen.

Depth cueing is another technique for producing a more realistic display. In depth cueing, an object's color is gradually blended into the background color (also known as the depth cue color), based on the distance from the viewer to the object. This distance is usually approximated by the depth, or Z value, of the object. Depth cueing may be used for simulating the atmospheric attenuation of light intensity. Thus, as objects get farther from the viewer, they appear dimmer. Any color can be used as the depth cue color, but black is used most often.

Prior art graphics systems with hardware geometry accelerators have typically used a lumped model for calculating depth cue. Depth cueing was performed on a per vertex basis. A depth cue scale factor was determined for each vertex based on the value of its Z coordinate. Then color values were computed for each vertex based on lighting equations and on the depth cue scale factor. The colors values were provided as rendering parameters to a hardware rasterizer, or scan converter.

The advent of texture mapping implemented in hardware has complicated the depth cueing process. As described above, texture mapping is a technique for coloring the interior of a three-dimensional polygon with the contents of a two-dimensional pixel map (or texture). The texture mapping hardware typically provides texture colors, or texels, on a per pixel basis. The texels are combined on a per pixel basis with the color values generated by the rasterizer to provide resulting pixel color values for display.

Depth cueing can be applied to shaded polygons as well as to texture mapped polygons. However, the lumped model for depth cueing on a per vertex basis does not work for systems having texture mapping implemented in hardware. The depth cued vertex parameters are interpolated in the rasterizer to produce individual pixel parameters. The pixel parameters are then blended with the corresponding texels from the texture mapping hardware to provide resulting pixel color values. However, it can be shown that depth cueing applied to the color values used by the rasterizer does not properly affect the texture mapped values and provides incorrect resulting color values.

SUMMARY OF THE INVENTION

The invention relates to computer graphics systems. Methods and apparatus for depth cueing on a per pixel basis are provided. A first circuit responsive to a depth cue scale function and vertex parameters of a triangle to be displayed determines a per vertex depth cue scale factor value for each vertex of the triangle. A second circuit responsive to the per vertex depth cue scale factor values and the vertex parameters of the triangle determines depth cue rendering parameters of the triangle. A third circuit responsive to the per vertex depth cue scale factor value for a selected vertex of the triangle and the depth cue rendering parameters determines a per pixel depth cue scale factor for each of the pixels in the triangle. A fourth circuit responsive to the vertex parameters of the triangle determines per pixel color values for each of the pixels in the triangle. A fifth circuit responsive to the per pixel depth cue scale factor value, the per pixel color values and a depth cue color determines per pixel depth cued color values for each of the pixels in the triangle.

In a preferred embodiment, the computer graphics system includes textured mapping hardware for generating texture mapped color values. In this case, the apparatus further includes a circuit for blending the per pixel color values and the texture mapped color values to provide per pixel resulting color values. The per pixel depth cue scale factor value, the per pixel resulting color values and the depth cue color are used by the fifth circuit to determine per pixel depth cued color values for each of the pixels in the triangle.

The present invention provides methods and apparatus for depth cueing on a per pixel basis. Depth cueing is performed on resulting per pixel color values for a triangle, typically after blending with texture mapped color values. The technique provides accurate depth cueing with or without texture mapping.

BRIEF DESCRIPTION OF THE DRAWINGS

For a better understanding of the present invention, reference is made to the accompanying drawings, which are incorporated herein by reference and in which:

FIG. 3 is a block diagram of a scan converter incorporating per pixel depth cueing in accordance with the invention;

FIG. 4 is a block diagram of the pixel generator shown in FIG. 3;

FIG. 5 is a block diagram representative of each parameter interpolator shown in FIG. 4;

DETAILED DESCRIPTION

Figure 1:
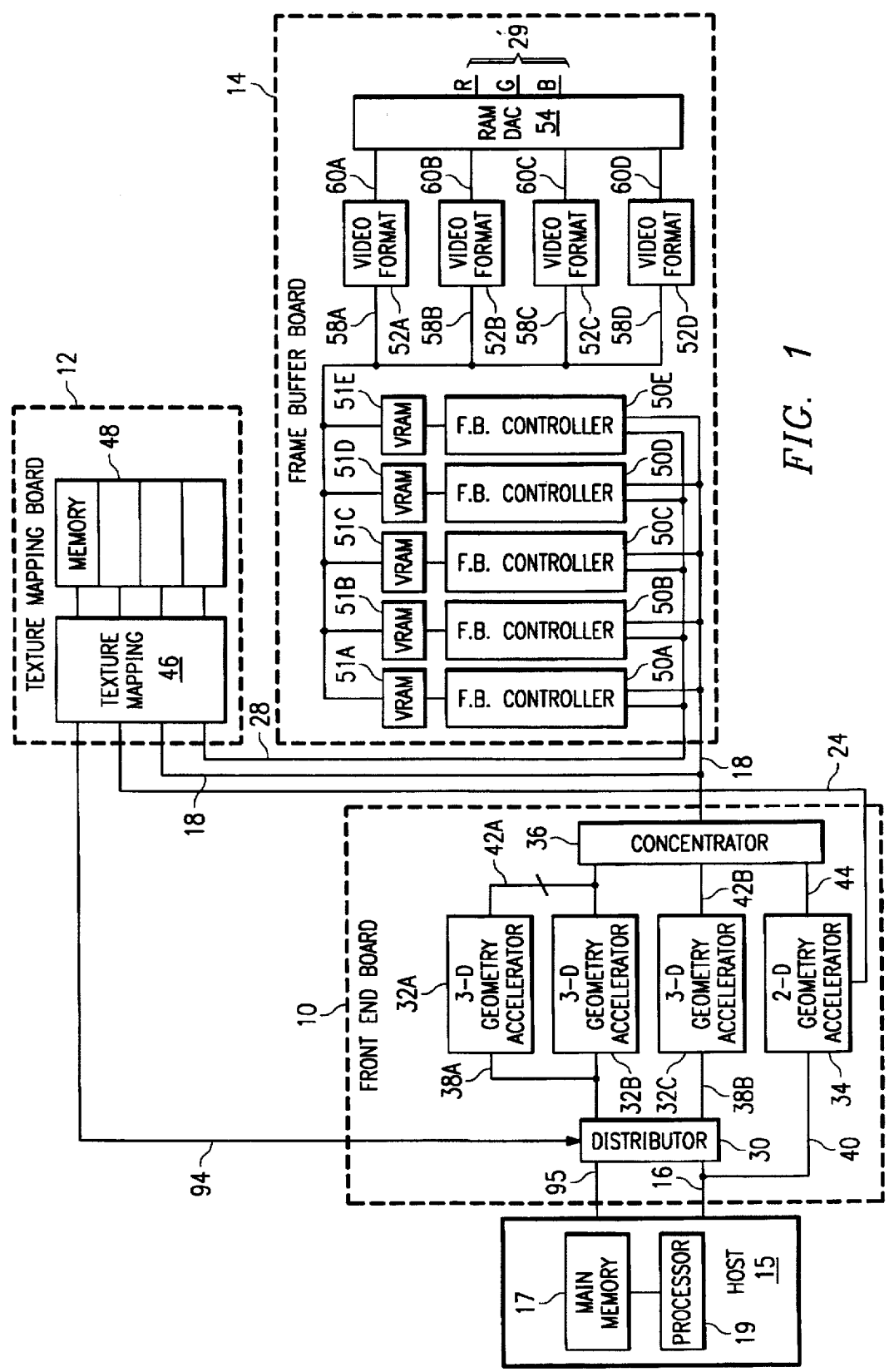
FIG. 1 is a block diagram of a first embodiment of a computer graphics system incorporating the present invention.

FIG. 1 is a block diagram of a first embodiment of a computer graphics system suitable for incorporation of depth cueing on a per pixel basis in accordance with the present invention. It should be understood that the illustrative implementation shown is merely exemplary with respect to the number of boards and chips, the manner in which they are partitioned, the bus widths, and the data transfer rates. Numerous other implementations can be employed. As shown, the system includes a front end board 10, a texture mapping board 12, and a frame buffer board 14. The front end board communicates with a host computer 15 over a 52-bit bus 16. The front end board receives primitives to be rendered from the host computer over bus 16. The primitives are specified by X,Y,Z coordinate data, R,G,B color data and texture S,T coordinates for portions of the primitives, such as for the vertices when the primitive is a triangle.

Data representing the primitives in three dimensions then is provided by the front end board 10 to the texture mapping board 12 and the frame buffer board 14 over 64-bit bus 18. The texture mapping board interpolates the primitive data received to compute the screen display pixels that will represent the primitive, and determines corresponding resultant texture data for each primitive pixel. The resultant texture data is provided to the frame buffer board over five 55-bit buses 28, which are shown in FIG. 1 as a single bus for clarity of illustration.

The frame buffer board 14 also interpolates the primitive data received from the front end board 10 to compute the pixels on the display screen that will represent each primitive, and to determine object color values for each pixel. The frame buffer board then combines, on a pixel by pixel basis, the object color values with the resultant texture data provided from the texture mapping board, to generate resulting image R,G,B values for each pixel. R,G,B color control signals for each pixel are respectively provided over R,G,B lines 29 to control the pixels of the display screen (not shown) to display a resulting image on the display screen that represents the texture mapped primitive.

The front end board 10, texture mapping board 12 and frame buffer board 14 each is preferably pipelined and operates on multiple primitives simultaneously. While the texture mapping and frame buffer boards operate on primitives previously provided by the front end board, the front end board continues to operate upon and provide new primitives until the pipelines in the boards 12 and 14 become full.

The front end board 10 may include a distributor chip 30, 3-dimensional (3-D) geometry accelerator chips 32A, 32B and 32C, a two-dimensional (2-D) geometry accelerator chip 34 and a concentrator chip 36. The distributor chip 30 receives the X,Y,Z coordinate and color primitive data over bus 16 from the host computer, and distributes 3-D primitive data evenly among the 3-D geometry accelerator chips 32A, 32B and 32C. In this manner, the system bandwidth is increased because three groups of primitives are operated upon simultaneously. Data is provided over 40-bit bus 38A to the 3-D geometry accelerator chips 32A and 32B, and over 40-bit bus 38B to chip 32C. Both buses 38A and 38B transfer data at a rate of 60 MHz and provide sufficient bandwidth to support two 3-D geometry accelerator chips. 2-D primitive data is provided over a 44-bit bus 40 to the 2-D geometry accelerator chip 34 at a rate of 40 MHz.

Each 3-D geometry accelerator chip transforms the X,Y,Z coordinates that define the primitives received into corresponding screen space coordinates, determines object R,G,B values and texture S,T values for the screen space coordinates, decomposes quadrilaterals into triangles, and computes a triangle plane equation to define each triangle. Each 3-D geometry accelerator chip also performs view clipping operations to ensure an accurate screen display of the resulting image when multiple windows within the screen are displayed, or when a portion of a primitive extends beyond the view volume represented on the display screen. Relevant operations performed by each 3-D geometry accelerator chip are described in more detail below. Output data from the 3-D geometry accelerator chips 32A, 32B and 32C is provided over 44-bit buses 42A and 42B to concentrator chip 36 at a rate of 60 MHz. Two-dimensional geometry accelerator chip 34 also provides output data to concentrator chip 36 over a 46-bit bus 44 at a rate of 45 MHz. Concentrator chip 36 combines the 3-D primitive output data received from the 3-D geometry accelerator chips 32A-C, re-orders the primitives to the original order they had prior to distribution by the distributor chip 30, and provides the combined primitive output data over bus 18 to the texture mapping and frame buffer boards.

Texture mapping board 12 includes a texture mapping chip 46 and a local memory 48 which is preferably arranged as a cache memory. In a preferred embodiment of the invention, the cache memory is formed from a plurality of SDRAM (synchronous dynamic random access memory) chips. The cache memory 48 stores texture MIP map data associated with the primitives being rendered in the frame buffer board. The texture MIP map data is downloaded from a main memory 17 of the host computer 15, over bus 40, through the 2-D geometry accelerator chip 34, and over 24-bit bus 24.

The texture mapping chip 46 successively receives primitive data over bus 18 representing the primitives to be rendered on the display screen. As discussed above, the primitives provided from the 3-D geometry accelerator chips 32A-C include points, lines and triangles. The texture mapping board does not perform texture mapping of points or lines, and operates only upon triangle primitives. The data representing the triangle primitives includes the X,Y,Z object pixel coordinates for one vertex, the object color R,G,B values of the same one vertex, the coordinates in S,T of the portions of the texture map that correspond to the same one vertex, and the plane equation of the triangle. The texture mapping chip 46 ignores the object pixel z coordinate and the object color R,G,B values. The chip 46 interpolates the X,Y pixel coordinates to calculate S and T coordinates that correspond to each X,Y screen display pixel that represents the primitive. For each pixel, the texture mapping chip accesses the portion of the texture MIP map that corresponds thereto from the cache memory, and computes resultant texture data for the pixel, which may include a weighted average of multiple texels.

The resultant texture data for each pixel is provided by the texture mapping chip 46 to the frame buffer board over five buses 28. The five buses 28 are respectively coupled to five frame buffer controller chips 50A, 50B, 50C, 50D and 50E provided on the frame buffer board, and provide resultant texture data to the frame buffer controller chips in parallel. The frame buffer controller chips 50A, 50B, 50C, 50D and 50E are respectively coupled to groups of associated VRAM (video random access memory) chips 51A-E. The frame buffer board may further include four video format chips, 52A, 52B, 52C and 52D, and a RAMDAC (random access memory digital-to-analog converter) 54. The frame buffer controller chips control different, non-overlapping segments of the display screen. Each frame buffer controller chip receives primitive data from the front end board over bus 18, and resultant texture mapping data from the texture mapping board over bus 28. The frame buffer controller chips interpolate the primitive data to compute the screen display pixel coordinates in their respective segments that represent the primitive, and the corresponding object R,G,B color values for each pixel coordinate. For those primitives (i.e., triangles) for which resultant texture data is provided from the texture mapping board, the frame buffer controller chips combine, on a pixel by pixel basis, the object color values and the resultant texture data to generate final R,G,B values for each pixel to be displayed on the display screen. A blending mode defining the manner in which the object and texture color values are combined is controlled by a rendering mode control word that is provided by the front end board 10 over bus 18.

The resulting image video data generated by the frame buffer controller chips 50A-E, including R,G,B values for each pixel, is stored in the corresponding VRAM chips 51A-E. Each group of VRAM chips 51A-E includes eight VRAM chips, such that forty VRAM chips are located on the frame buffer board. Each of video format chips 52A-D is connected to, and receives data from, a different set of ten VRAM chips. The video data is serially shifted out of the VRAM chips and is respectively provided over 64-bit buses 58A, 58B, 58C, and 58D to the four video format chips 52A, 52B, 52C and 52D at a rate of 27 MHz. The video format chips format the video data so that it can be handled by the RAMDAC and provide the formatted data over 32-bit buses 60A, 60B, 60C and 60D to RAMDAC 54 at a rate of 33 MHz. RAMDAC 54, in turn, converts the digital color data to analog R,G,B color control signals and provides the R,G,B control signals for each pixel to a screen display (not shown) along R,G,B control lines 29.

Figure 2:
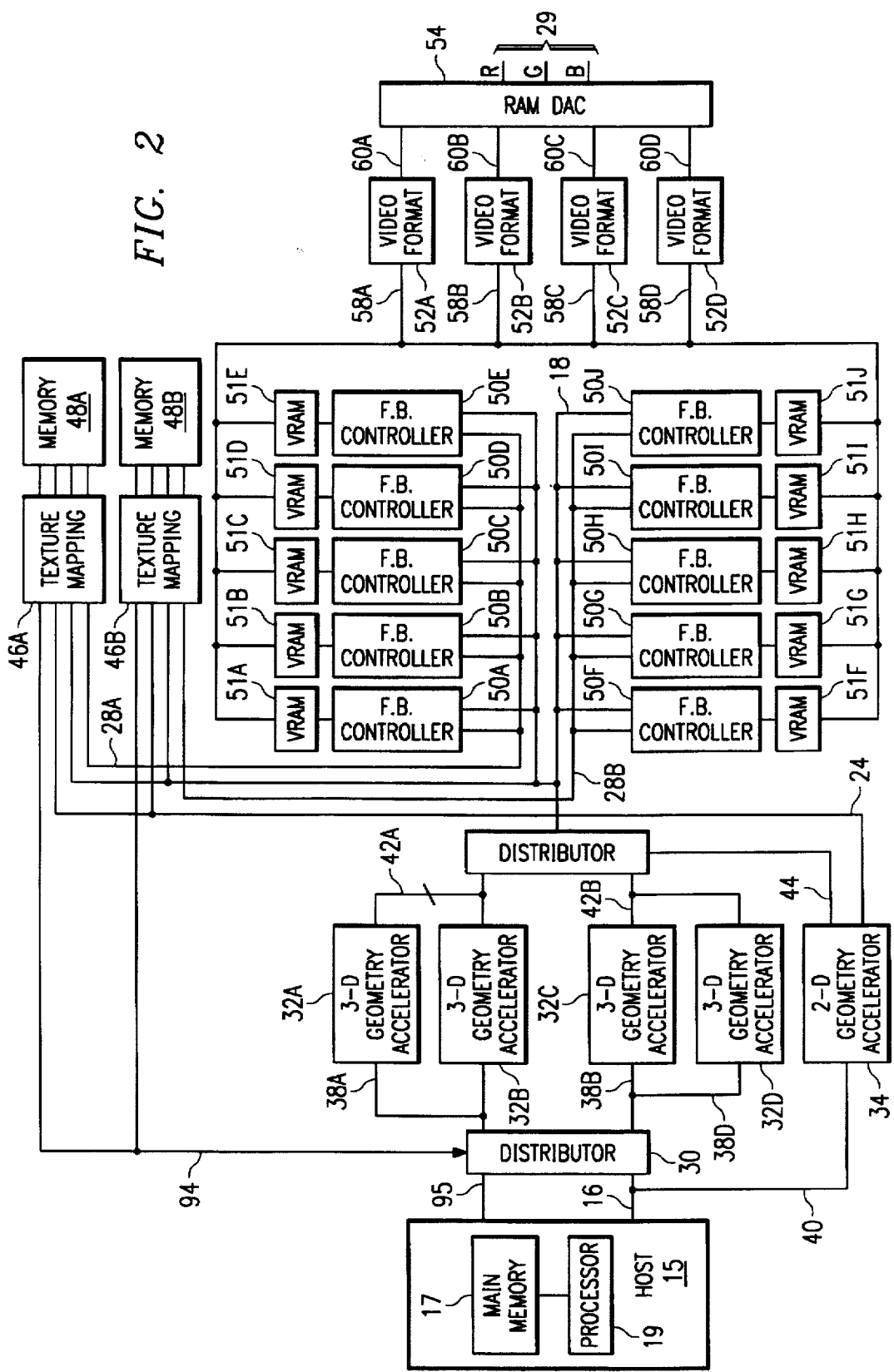
FIG. 2 is a block diagram of a second embodiment of a computer graphics system incorporating the present invention.

In one embodiment of the invention, hardware on the texture mapping board 12 and the frame buffer board 14 is replicated so that certain primitive rendering tasks can be performed on multiple primitives in parallel, thereby increasing the bandwidth of the system. An example of such an alternate embodiment of the present invention is shown in FIG. 2, which is a block diagram of a computer graphics system of the present invention having certain hardware replicated. The system of FIG. 2 includes four 3-D geometry accelerator chips 32A, 32B, 32C and 32D, two texture mapping chips 46A and 46B respectively associated with cache memories 48A and 48B, and ten frame buffer chips 50A-50J, each with an associated group of VRAM chips. The operation of the system of FIG. 2 is similar to that of the system of FIG. 1, described above. The replication of the hardware in the embodiment of FIG. 2 allows for increased system bandwidth because certain primitive rendering operations can be performed in parallel on multiple primitives.

Per pixel depth cueing in accordance with the present invention is described with reference to FIG. 3. The left portion of FIG. 3 labeled "geometry accelerator" represents circuitry in the 3-D geometry accelerator chips 32A, 32B and 32C (FIG. 1). The right portion of FIG. 3 labeled "scan converter" represents circuitry in the frame buffer controller chips 50A, 50B, 50C, 50D and 50E. Although the graphics system decomposes objects to be displayed into triangles, vectors and points, depth cueing is applied only to triangles. An edge calculation unit 110 in the geometry accelerator receives vertex parameters from the host computer. The vertex parameters may include, for each vertex, X, Y and Z coordinates, normal coordinates (NX, NY, NZ) color values (R, G, B, and α) and texture mapping values (S and T). The edge calculation unit 110 also receives depth cue parameters as discussed below. In general, the edge calculation unit calculates all rendering parameters required by the scan converter for rendering the triangle. Those parameters include the starting color values R, G, B and α. The rendering parameters also include the partial derivatives of each color parameter with respect to X and with respect to an edge $E_1$ of the triangle with the largest dimension in Y. In addition, the edge calculation unit 110 provides depth cue rendering parameters to the scan converter, including a depth cue scale factor value for the uppermost vertex in the triangle and partial derivatives of the depth cue scale factor with respect to X and edge $E_1$.

A pixel generator 112 in the scan converter interpolates each of the rendering parameters independently to calculate X and Y coordinates and color values for each pixel in the triangle. The per pixel colors include diffuse color values R, G, B and α and may include specular colors values $R_s$, $G_s$, $B_s$ and $α_s$. In addition, the pixel generator 112 calculates a depth cue scale factor on a per pixel basis. The per pixel values calculated by the pixel generator 112 are supplied to a texture blend unit 114. The texture blend unit 114 also receives texels from the texture mapping chip 46 (FIG. 1). The texels are texture color values $R_t$, $G_t$, $B_t$ and $α_t$ for each pixel. The per pixel color values from the pixel generator 112 and the texels from the texture mapping chip are combined in accordance with a preselected blending algorithm to provide resulting color values. The resulting color values are supplied to a depth cue blend unit 116. The pixel depth cue scale factor, supplied to the depth cue blend unit 116, passes through the texture blend unit 114 but is not used, in order to ensure that the pipelined data remains synchronized. The depth cue blend unit 116 combines the per pixel depth cue scale factor and a depth cue color with the resulting color values for each pixel to provide depth cued colors for each pixel.

Per pixel depth cueing is more accurate than depth cueing per vertex, because the two independent interpolations of color and depth cue scale factor are linear approximations. The independent interpolations are blended to produce a final result. The blending involves a multiplication of two first order equations, which results in a second order equation. Second order equations can more closely approximate a desired curve than first order equations.

Figure 6:
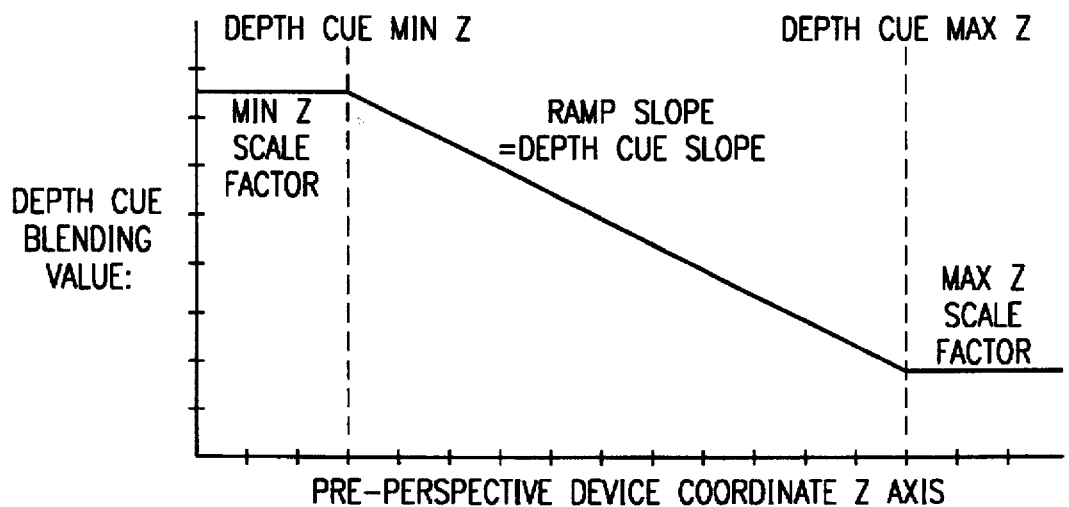
FIG. 6 is a graph of depth cue scale factor as a function of depth along the Z axis.

The operations performed by the units shown in FIG. 3 are now described in more detail. As indicated above, the edge calculation unit 110 determines a starting depth cue scale factor and partial derivatives of the scale factor with respect to edge $E_1$ and X. The starting value of the depth cue scale factor for each vertex depends on the Z value of the vertex. A depth cue region is established in Z space, with a minimum Z value and a maximum Z value. Different depth cue scale factors are set for vertices whose Z values are greater than the depth cue Z max or less than the depth cue Z min. The scale factor between the two Z limits is computed as a smooth ramp function between the Z min scale factor and the Z max scale factor. The depth cue scale factor function is illustrated in FIG. 6. The edge calculation unit receives the following parameters from the host computer in connection with the depth cue scale factor function shown in FIG. 6:

(1) depth cue min Z, (2) depth cue max Z, (3) min Z scale factor, (4) max Z scale factor, and (5) depth cue slope The depth cue scale factor for each vertex is determined as follows:

If vertex Z is less than depth cue rain Z, then scale factor=min Z scale factor;

If vertex Z is greater than depth cue max Z, then scale factor=max Z scale factor;

Otherwise, scale factor=min Z scale factor+(vertex Z—depth cue min Z) x depth cue slope. This provides the depth cue scale factor starting value at vertex 0 of the triangle.

The edge calculation unit 110 also calculates depth cue slopes, dDC/dX and $dDC/dE_1$ in accordance with the following equations:

$$dDC/dX = \frac{Y_0 DC_1 - Y_1 DC_0}{X_2 Y_1 - Y_2 X_1}$$

$$dDC/dE_1 = (dDC/dX * int(E_1 \text{ Slope})) + dDC/dY$$

where:

$X_i$ and $Y_i$, i=0, 1, 2 are the coordinates of vertex i;

$DC_i$, i=0, 1, 2 is the depth cue scale factor of vertex i, int () is the integer value, $$E_1 \text{ Slope} = \frac{X_2 - X_0}{Y_2 - Y_0}$$

$$\text{and } dDC/dY = \frac{X_0 DC_1 - X_1 DC_0}{X_2 Y_1 - Y_2 X_1}$$

These values are used by the pixel generator to determine the per pixel depth cue scale factor.

A block diagram of the pixel generator 112 is shown in FIG. 4. The rendering parameters from the geometry accelerator are placed in rendering parameter registers 130. The respective rendering parameters are supplied from registers 130 to an alpha interpolator 131, a red interpolator 132, a green interpolator 133, a blue interpolator 134, a depth cue scale factor interpolator 135, a red specular interpolator 136, a green specular interpolator 137 and a blue specular interpolator 138. The interpolators 131-138 contain identical circuitry and operate independently and simultaneously on different parameters for high throughput.

Figure 7:
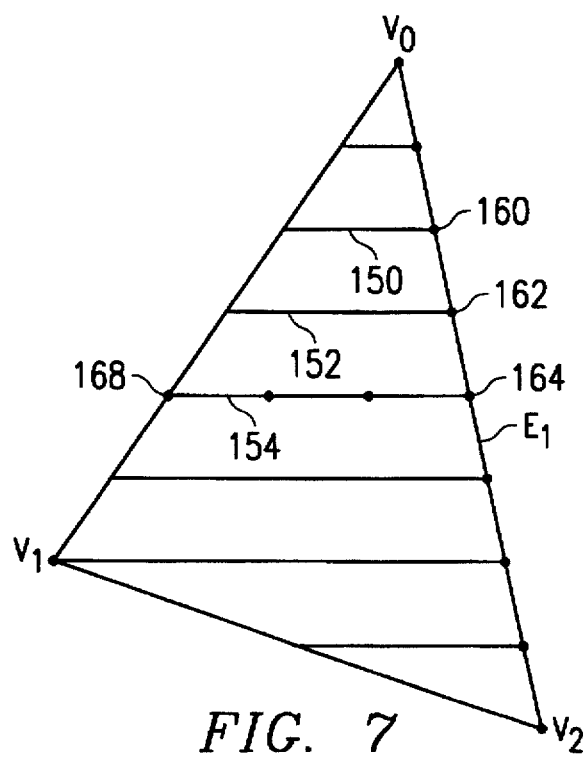
FIG. 7 is an illustration of the triangle rendering process.

In general, each parameter is calculated for each pixel in the triangle. A triangle having vertices $V_0, V_1$ and $V_2$ is shown in FIG. 7. The interpolator first steps along edge $E_1$ of the triangle from vertex $V_0$ to vertex $V_2$ and determines the starting value of the parameter for each row of pixels in the triangle. Pixel rows 150, 152, 154, etc. are shown in FIG. 7. The starting values of the parameter are determined for pixel rows 150, 152, 154 at pixels 160, 162 and 164, respectively. The length of each pixel row in the triangle is known as its span. Thus, for example, with reference to FIG. 7, pixel row 154 has a span from pixel 164 to pixel 168. The starting parameter values for each pixel row are determined from the starting value of the parameter at vertex $V_0$ and the slope of the parameter along edge $E_1$. After the starting values for each pixel row have been determined, the interpolator steps along each pixel row in the X direction and determines the parameter value at each pixel, using the starting value for the pixel row and the slope of the parameter value as a function of X. The parameter values for each pixel in the triangle are provided to the texture blend unit 114 (FIG. 3).

A block diagram representative of each interpolator in the pixel generator 112 is shown in FIG. 5. An edge stepper computes the parameters along the edges of each triangle. As shown in FIG. 5, the edge stepper includes two stages. A first edge stepper 180 generates X and Y values of each pixel along edge $E_1$, while a second edge stepper 182 computes the color and Z values. Two edge steppers are preferred for high performance, because the results of the X and Y computations are required for the color and Z computations.

A tile clipper, including a first tile clipper 184 and a second tile clipper 186, restricts pixels and spans to be within the range of the VRAM chip (FIG. 1) corresponding to each scan converter. As indicated previously, the scan converter is divided into separate frame buffer controller chips, which operate in parallel with corresponding VRAM chips for high throughput. Each VRAM chip preferably handles a tile of the display screen comprising 16 pixels in X by 2 pixels in Y. The tile clipper restricts the pixels processed by the interpolator to those within the 16 by 2 pixel range of the corresponding VRAM. This improves performance by eliminating unnecessary cycles for pixels that are outside of the range of the corresponding VRAM chip. The tile clipper splits each span of the triangle being rendered into subspans of 16 pixels maximum that are within the range of the corresponding VRAM chip. By preventing unnecessary pixels from being generated in the span stepper, the rendering performance is significantly improved.

The output of the tile clipper is supplied through a span/pixel FIFO 190 to a span stepper 192. In a preferred embodiment, the span/pixel FIFO is 64 entries deep. The span stepper 192 generates pixel parameters based on the edge information for each span in the triangle. Spans have a constant Y value and can be stepped in either the positive or negative X direction depending on the triangle type. The output of the span stepper 192 is set of parameter values for each pixel in the triangle being rendered. As discussed above in connection with FIG. 4, the pixel generator 112 provides interpolated, per pixel parameter values for red, green, blue, alpha, depth cue scale factor, red specular, green specular, and blue specular. Interpolation circuits for generating per pixel parameter values from rendering parameters by edge stepping and span stepping are known to those skilled in the art.

As indicated previously, the texture blend unit 114 shown in FIG. 3 blends the diffuse values generated by the pixel generator 112 with texture color values received from the texture mapping unit to provide intermediate color values. The specular color values generated by the pixel generator 112 are optionally added to these intermediate color values to provide resulting color values. In a preferred embodiment, the texture blend unit 114 has several texture blending modes, one of which is selected for use in rendering each triangle. In a "no change" mode, the diffuse color values are used without modification by texture colors. This may be appropriate when the triangle being rendered does not require texture or when the graphics system does not include texture mapping. In this case, the diffuse color values are not modified. In a "replace" mode, the diffuse color values from the pixel generator are replaced with the texture map color values. It is noted that prior art per vertex depth cueing would be completely ineffective in the replace mode because the depth cue information would be lost. In a "modulate" mode, the diffuse color values are multiplied by the texture map color values. In a "decal" mode, the diffuse color values from the pixel generator are blended with the texture map color values in accordance with a blending percentage based on the texel alpha value. After texture blending, the specular color values are optionally added to produce the resulting color values. The resulting color values output by the texture blend unit 114 are supplied to the depth cue blend unit 116.

The depth cue blend unit 116 performs depth cueing of each color value on a per pixel basis. The depth cue blend unit 116 implements the following equation:

$$\text{Depth cued pixel color} = \text{pixel color} \times \text{depth cue scale factor} + \text{depth cue color} \times (1 - \text{depth cue scale factor}).$$

The pixel color used in the above equation is the resulting color value received from the texture blend unit 114. The depth cue scale factor is the per pixel value computed by the pixel generator 112. The depth cue color is specified by the host computer and is fixed for each triangle. The depth cue color is typically black but may have other color values. The result is a depth cued pixel color value for each pixel in the triangle.

The per pixel approach to depth cueing provides a more accurate representation of depth cueing than the per vertex approach. This results from the form of the equation for the depth cued pixel color value. In per vertex depth cueing that is linearly interpolated in the scan converter, the final pixel color is represented by a first order equation. In per pixel depth cueing, where both colors and depth cue scale factor are linearly interpolated and then blended, the final pixel color is represented by a second order equation, which provides greater accuracy.

The per pixel approach to depth cueing allows the proper application of depth cueing to texture mapped polygons. Depth cueing must be performed after the texture map has been applied. Otherwise, the depth cue information is distorted or even lost (for example, in the replace texel blending mode).

The circuitry described herein is preferably implemented in a large scale custom integrated circuit using logic synthesis software that is commercially available, for example, from Synopsys. The logic synthesis software optimizes and translates circuit descriptions written in high level languages, such as Verilog, into logic gates. The circuitry may be implemented using a CMOS process that produces 1 micron FET's which operate at 5 volts, a CMOS process that produces 0.6 micron drawn gate length devices which operate at 3.3 volts, or any other suitable process for implementing digital circuits. Since the input to the logic synthesis software is functional rather than structural, actual circuits generated by the logic synthesis software may differ from those disclosed herein.

While there have been shown and described what are at present considered the preferred embodiments of the present invention, it will be obvious to those skilled in the art that various changes and modifications may be made therein without departing from the scope of the invention as defined by the appended claims.

What is claimed is:

1. In a computer graphics system, apparatus for depth cueing colors, comprising:

a first circuit, responsive to a depth cue scale factor function and vertex parameters of a triangle to be displayed as a plurality of pixels, for determining a per vertex depth cue scale factor value for each vertex of the triangle;

a second circuit, responsive to the per vertex depth cue scale factor values and the vertex parameters of the triangle, for determining depth cue rendering parameters of the triangle;

a third circuit, responsive to the per vertex depth cue scale factor value for a selected vertex of the triangle and the depth cue rendering parameters, for determining a per pixel depth cue scale factor value for each of the pixels in the triangle;

a fourth circuit, responsive to the vertex parameters of the triangle, for determining per pixel color values for each of the pixels in the triangle; and a fifth circuit, responsive to the per pixel depth cue scale factor value, the per pixel color values and a depth cue color, for determining per pixel depth cued color values for each of the pixels in the triangle.

2. Apparatus as defined in claim 1 wherein said second circuit includes means for determining a first slope of the depth cue scale factor along an edge of the triangle adjacent to the selected vertex and a second slope of the depth cue scale factor along a pixel row direction.

3. Apparatus as defined in claim 1 wherein said third circuit includes an edge stepper for determining a depth cue scale factor value at each pixel row along said edge and a span stepper for determining the per pixel depth cue scale factor value for each pixel row in the triangle.

4. Apparatus as defined in claim 1 wherein the fifth circuit includes means for determining the per pixel depth cued color values in accordance with:

$$\text{depth cued pixel color} = \text{pixel color} \times \text{depth cue scale factor} + \text{depth cue color} \times (1 - \text{depth cue scale factor}).$$

5. In a computer graphics system having texture mapping hardware for generating texture mapped color values, apparatus for depth cueing colors, comprising:

a first circuit, responsive to a depth cue scale factor function and vertex parameters of a triangle to be displayed as a plurality of pixels, for determining a per vertex depth cue scale factor value for each vertex of the triangle;

a second circuit, responsive to the per vertex depth cue scale factor values and the vertex parameters of the triangle, for determining depth cue rendering parameters of the triangle;

a third circuit, responsive to the per vertex depth cue scale factor value for a selected vertex of the triangle, and the depth cue rendering parameters, for determining a per pixel depth cue scale factor value for each of the pixels in the triangle;

a fourth circuit, responsive to the vertex parameters of the triangle, for determining per pixel color values for each of the pixels in the triangle;

a fifth circuit, for blending the per pixel color values and the texture mapped color values to provide per pixel resulting color values; and a sixth circuit, responsive to the per pixel depth cue scale factor value, the per pixel resulting color values and a depth cue color, for determining per pixel depth cued color values for each of the pixels in the triangle.

6. Apparatus as defined in claim 5 said second circuit includes means for determining a first slope of the depth cue scale factor along an edge of the triangle adjacent to the selected vertex and a second slope of the depth cue scale factor along a pixel row direction.

7. Apparatus as defined in claim 5 wherein said third circuit includes an edge stepper for determining a depth cue scale factor value at each pixel row along said edge and a span stepper for determining the per pixel depth cue scale factor value for each pixel row in the triangle.

8. Apparatus as defined in claim 5 wherein the sixth circuit includes means for determining the per pixel depth cued color values in accordance with:

*depth cued pixel color=pixel color x depth cue scale factor+depth cue color x (1−depth cue scale factor).*

9. In a computer graphics system, comprising geometry accelerator hardware and a scan converter for generating a graphic display on a video display screen, a method for depth cueing colors in the graphic display, comprising the steps of:

determining, in a first circuit, a per vertex depth cue scale factor for each vertex of a triangle to be displayed as a plurality of pixels in response to a depth cue scale factor and vertex parameters of the triangle;

determining, in a second circuit, depth cue rendering parameters of the triangle in response to the per vertex depth cue scale factor values and the vertex parameters of the triangle;

determining, in a third circuit, a per pixel depth cue scale factor value for each of the pixels in the triangle in response to the per vertex depth cue scale factor value for a selected vertex of the triangle and the depth cue rendering parameters;

determining, in a fourth circuit, per pixel color values for each of the pixels in the triangle in response to the vertex parameters of the triangle; and determining, in a fifth circuit, per pixel depth cued color values for each of the pixels in the triangle in response to the per pixel depth cue scale factor value, the per pixel color values and a depth cue color.

10. A method for depth cueing as defined in claim 9 wherein said computer graphics system includes texture mapping hardware for generating texture mapped color values, said method further including the step of blending the per pixel color values and the texture mapped color values to provide per pixel resulting color values, wherein the step of determining per pixel depth cued color values uses the per pixel resulting color values following the step of blending the per pixel color values and the texture mapped color values.

11. In a computer graphics system comprising geometry accelerator hardware, texture mapping hardware for generating texture mapped color values and a scan converter for generating a graphic display on a video display screen, a method for depth cueing colors in the graphic display, comprising the steps of:

determining, in a first circuit, a per vertex depth cue scale factor for each vertex of a triangle to be displayed as a plurality of pixels in response to a depth cue scale factor and vertex parameters of the triangle;

determining, in a second circuit, depth cue rendering parameters of the triangle in response to the per vertex depth cue scale factor values and the vertex parameters of the triangle;

determining, in a third circuit, a per pixel depth cue scale factor value for each of the pixels in the triangle in response to the per vertex depth cue scale factor value for a selected vertex of the triangle and the depth cue rendering parameters;

determining, in a fourth circuit, per pixel color values for each of the pixels in the triangle in response to the vertex parameters of the triangle; blending, in a fifth circuit, the per pixel color values and the texture mapped color values to provide per pixel resulting color values; and determining, in a sixth circuit, per pixel depth cued color values for each of the pixels in the triangle in response to the per pixel depth cue scale factor value, the per pixel resulting color values and a depth cue color.

12. In a computer graphics system, apparatus for depth cueing colors, comprising:

a first circuit, responsive to a depth cue scale factor function and vertex parameters of a graphics primitive to be displayed as a plurality of pixels, for determining a per vertex depth cue scale factor value for each vertex of the graphics primitive;

a second circuit, responsive to the per vertex depth cue scale factor values and the vertex parameters of the graphics primitive, for determining depth cue rendering parameters of the graphics primitive;

a third circuit, responsive to the per vertex depth cue scale factor value for a selected vertex of the graphics primitive and the depth cue rendering parameters, for determining a per pixel depth cue scale factor value for each of the pixels in the graphics primitive;

a fourth circuit, responsive to the vertex parameters of the graphics primitive, for determining per pixel color values for each of the pixels in the graphics primitive; and a fifth circuit, responsive to the per pixel depth cue scale factor value, the per pixel color values and a depth cue color, for determining per pixel depth cued color values for each of the pixels in the graphics primitive.

13. In a computer graphics system having texture mapping hardware for generating texture mapped color values, apparatus for depth cueing colors, comprising:

a first circuit, responsive to a depth cue scale factor function and vertex parameters of a graphics primitive to be displayed as a plurality of pixels, for determining a per vertex depth cue scale factor value for each vertex of the graphics primitive;

a second circuit, responsive to the per vertex depth cue scale factor values and the vertex parameters of the graphics primitive, for determining depth cue rendering parameters of the graphics primitive;

a third circuit, responsive to the per vertex depth cue scale factor value for a selected vertex of the graphics primitive, and the depth cue rendering parameters, for determining a per pixel depth cue scale factor value for each of the pixels in the graphics primitive;

a fourth circuit, responsive to the vertex parameters of the graphics primitive, for determining per pixel color values for each of the pixels in the graphics primitive;

a fifth circuit, for blending the per pixel color values and the texture mapped color values to provide per pixel resulting color values; and a sixth circuit, responsive to the per pixel depth cue scale factor value, the per pixel resulting color values and a depth cue color, for determining per pixel depth cued color values for each of the pixels in the graphics primitive.

14. In a computer graphics system, comprising geometry accelerator hardware and a scan converter for generating a graphic display on a video display screen, a method for depth cueing colors in the graphic display, comprising the steps of:

determining, in a first circuit, a per vertex depth cue scale factor for each vertex of a graphics primitive to be displayed as a plurality of pixels in response to a depth cue scale factor and vertex parameters of the graphics primitive;

determining, in a second circuit, depth cue rendering parameters of the graphics primitive in response to the per vertex depth cue scale factor values and the vertex parameters of the graphics primitive;

determining, in a third circuit, a per pixel depth cue scale factor value for each of the pixels in the graphics primitive in response to the per vertex depth cue scale factor value for a selected vertex of the graphics primitive and the depth cue rendering parameters;

determining, in a fourth circuit, per pixel color values for each of the pixels in the graphics primitive in response to the vertex parameters of the graphics primitive; and determining, in a fifth circuit, per pixel depth cued color values for each of the pixels in the graphics primitive in response to the per pixel depth cue scale factor value, the per pixel color values and a depth cue color.

15. In a computer graphics system comprising geometry accelerator hardware, texture mapping hardware for generating texture mapped color values and a scan converter for generating a graphic display on a video display screen, a method for depth cueing colors in the graphic display, comprising the steps of:

determining, in a first circuit, a per vertex depth cue scale factor for each vertex of a graphics primitive to be displayed as a plurality of pixels in response to a depth cue scale factor and vertex parameters of the graphics primitive;

determining, in a second circuit, depth cue rendering parameters of the graphics primitive in response to the per vertex depth cue scale factor values and the vertex parameters of the graphics primitive;

determining, in a third circuit, a per pixel depth cue scale factor value for each of the pixels in the graphics primitive in response to the per vertex depth cue scale factor value for a selected vertex of the graphics primitive and the depth cue rendering parameters;

determining, in a fourth circuit, per pixel color values for each of the pixels in the graphics primitive in response to the vertex parameters of the graphics primitive;

blending, in a fifth circuit, the per pixel color values and the texture mapped color values to provide per pixel resulting color values; and determining, in a sixth circuit, per pixel depth cued color values for each of the pixels in the graphics primitive in response to the per pixel depth cue scale factor value, the per pixel resulting color values and a depth cue color.

* * * * *